C. P. STEWART.
DECORTICATING MACHINE.
APPLICATION FILED JUNE 30, 1919.
1,374,407.
Patented Apr. 12, 1921.
3 SHEETS—SHEET 1.
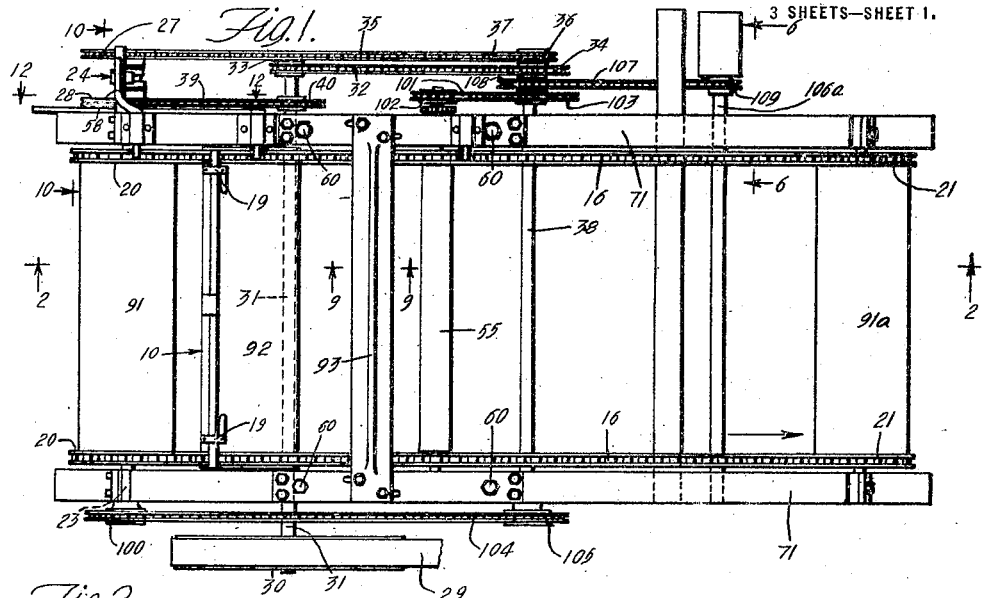
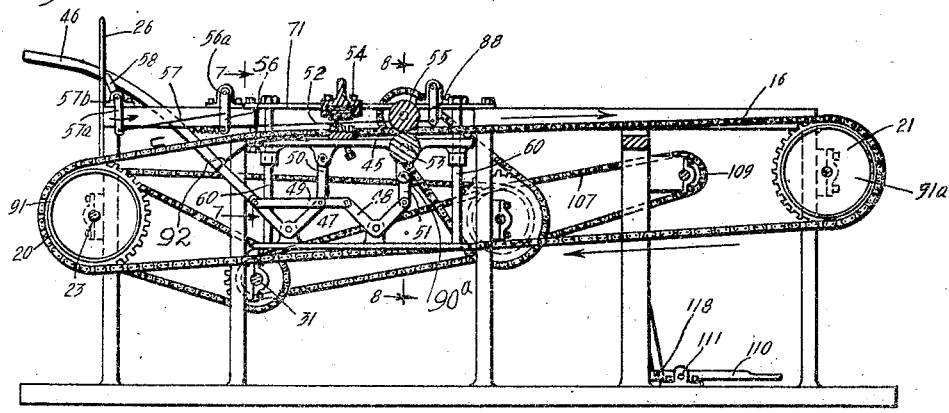
Inventor
Charles Parris Stewart
by
James T. Banketer
his Attorney.

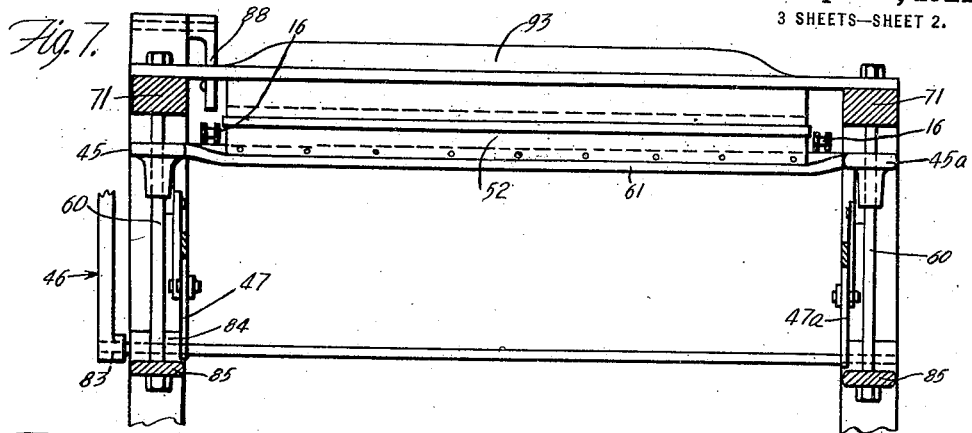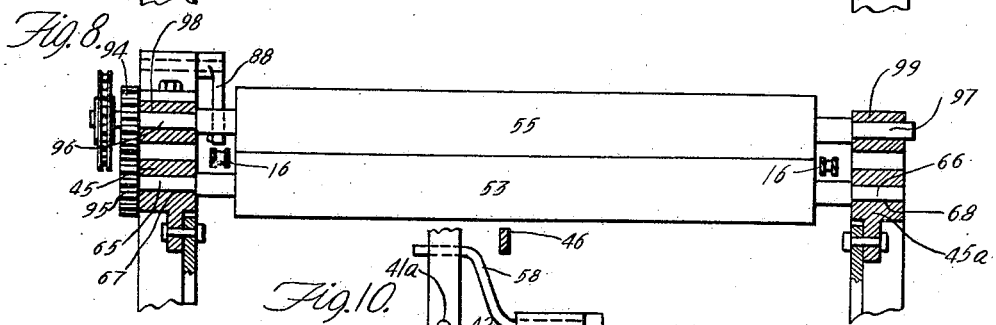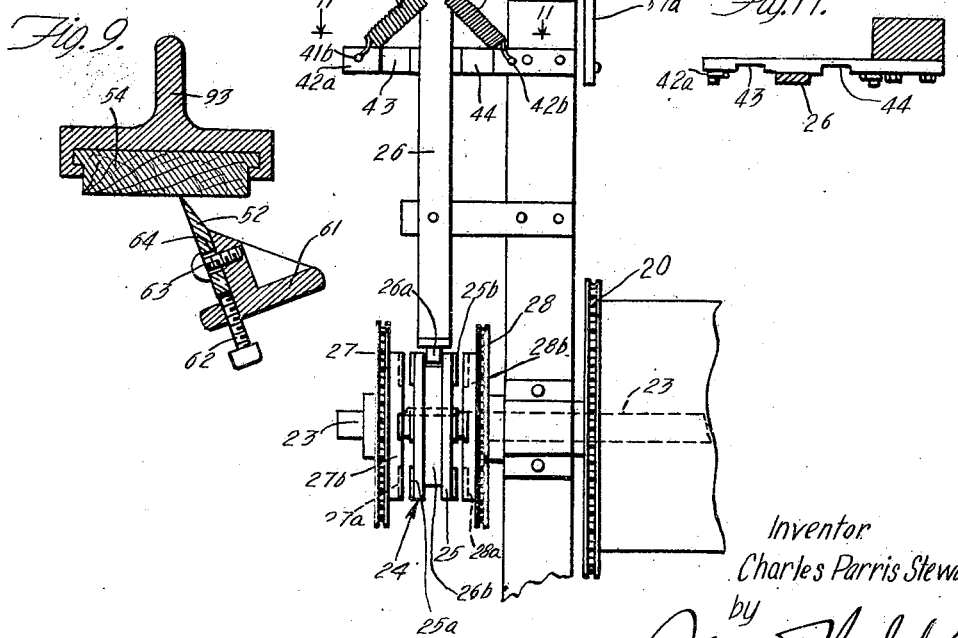

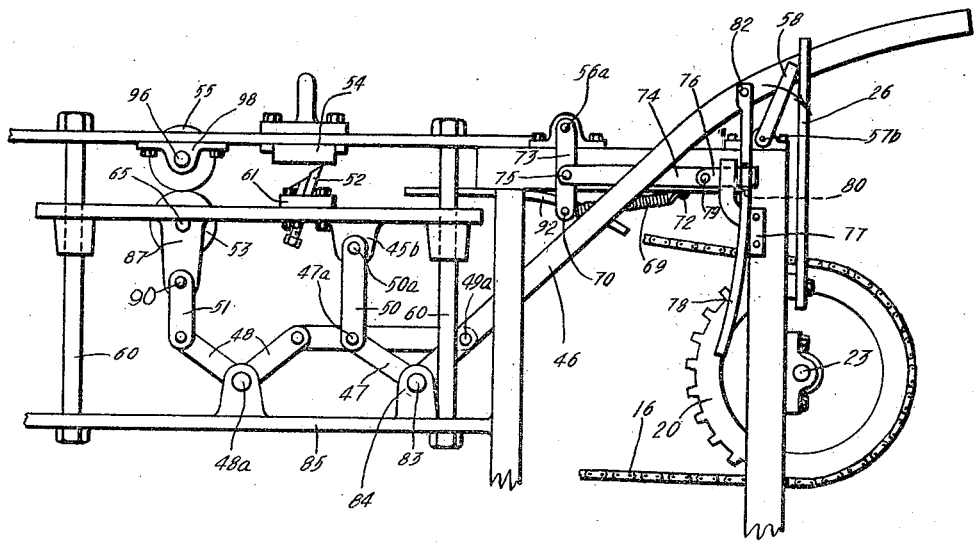

UNITED STATES PATENT OFFICE.

CHARLES PARRIS STEWART, OF MANILA, PHILIPPINE ISLANDS.

DECORTICATING-MACHINE.

1,374,407.　　　　　Specification of Letters Patent.　　Patented Apr. 12, 1921.

Application filed June 30, 1919. Serial No. 307,773.

*To all whom it may concern:*

Be it known that I, CHARLES PARRIS STEWART, a citizen of the United States, residing at Manila, Philippine Islands, have invented new and useful Improvements in Decorticating-Machines, of which the following is a specification.

The present invention relates to decorticating machines and it is an object of the invention to provide a simple easily operated machine that will thoroughly clean the pulp and the skin or bark from plant or vegetable matter.

A further object of the invention is to provide a machine that will thoroughly treat Manila hemp fiber although the application of the invention is not limited to hemp but may be applied to any fibrous plant.

The hemp stems or leaves to be cleaned or stripped are held in a rack or clamp which is attached to endless chains, and the chains carrying the clamp drag the hemp through a scraper and then between rollers thereby stripping and squeezing the skin and pulp from the fiber. In such a machine I have provided certain improvements which will appear in detail from the following detailed description of a machine embodying the invention reference being had in the description to the accompanying drawings, in which—

Figure 1 is a plan of the machine; Fig. 2 is a section taken as indicated by line 2—2 on Fig. 1; Fig. 3 shows a clamp in which the hemp is held; Fig. 4 is an enlarged detail view showing the attachment of the clamp to the endless chain; Fig. 5 is an enlarged section as indicated by line 5—5 of Fig. 3; Fig. 6 is an enlarged view taken as indicated by line 6—6 of Fig. 1; Fig. 7 is an enlarged section taken as indicated by line 7—7 of Fig. 2; Fig. 8 is an enlarged section taken as indicated by line 8—8 of Fig. 2; Fig. 9 is an enlarged section taken as indicated by line 9—9 of Fig. 1, showing the scraper; Fig. 10 is an enlarged view taken as indicated by line 10—10 of Fig. 1, showing the clutch arrangement; Fig. 11 is a view taken as indicated by line 11—11 of Fig. 10; and Fig. 12 is an enlarged view taken as indicated by line 12—12 of Fig. 1.

The hemp stems or leaves are held in a clamp designated by 10 in the drawings. The clamp 10 as shown in Figs. 3 and 4 comprises a bar 11 at the middle of which are hinged arms 12. The ends of the hemp are placed between the bar 11 and the arms 12, and the arms are clamped tightly over the hemp by means of clamping cams 13. The clamping cams are pivoted to arms $13^a$ at $13^b$, said arms being pivotally connected to bar 11 at $11^a$. This construction allows the clamping cams to be swung out of the way when the clamps are released thus allowing the arms 12 to swing out for the placement or removal of the hemp. The surfaces 14 and 15 of bar 11 and arms 12 are grooved as shown in Fig. 5 and mesh so as to grip the hemp firmly and prevent it from pulling out when it is being pulled through the machine.

The clamp 10 when filled with hemp is attached to chains 16 by being placed in U-shaped brackets 19 and are held by means of spring catches 17, which are mounted on bar 11, engaging holes 18 in the brackets 19, which are mounted on the chains. The attachment of the bar 11 to the brackets 19 in this manner not only holds the bar in the brackets while the machine is in operation but also prevents the chains from spreading so as to allow the bar to slip out of the brackets. The chains 16 run over sprockets 20 and 21 and are driven in the direction indicated by the arrows. Sprockets 20 are mounted on shaft 23 the rotation of which is controlled by a clutch 24. The clutch member 25 (which is controlled by lever 26, by means of roller $26^a$ which is mounted on the end of the lever 26 engaging groove $26^b$ in member 25) is slidably keyed to shaft 23 and may be operated so as to cause shaft 23 to be driven either by sprocket 27 or sprocket 28.

The machine is driven by belt 29 running on pulley 30 which is mounted on shaft 31. Hub $28^b$ is driven from shaft 31 by chain 39 running over sprockets 28 and 40, sprocket 28 being mounted on hub $28^b$ and sprocket 40 being mounted on shaft 31. Hub 37, on which are mounted sprockets 34, 36 and 108, is driven from shaft 31 by chain 32 which runs over sprockets 33 and 34; sprocket 33 being mounted on shaft 31. Hub $27^b$, on which is mounted sprocket 27, is driven by chain 35 running over sprockets 27 and 36. Hubs $27^b$ and $28^b$ both run loosely on shaft 23 and are constantly driven in the same direction. Hub $27^b$ is driven slowly and hub $28^b$ is driven more rapidly. When clutch member 25 is shifted so as to cause lugs $25^a$ on said member to engage notches 27ª in hub 27ᵇ then shaft 23 is driven slowly, and when clutch member 25 is shifted so as to cause lugs 25ᵇ on said member to engage notches 28ª in hub 28ᵇ then shaft 23 is driven more rapidly. This makes it possible to operate the machine fast or slow as desired. The shifting lever 26 which shifts clutch member 25 is held in neutral position by springs 41 and 42, which are attached to the lever arm 26 at 41ª and bracket 42ª at 41ᵇ and 42ᵇ respectively. When lever 26 has been shifted so as to cause the clutch to be engaged on either side it is pushed into either notch 43 or 44, to hold the clutch in engagement.

When the clamp 10 has been secured to chains 16 carriers 45 which slide on rods 60 are in their lowered position and allow the clamp 10 to pass between the scraper blade 52 and block 54 and between rollers 53 and 55. The scraper blade 52 and roller 53 are mounted on the carriers 45. The blade 52 is adjustably mounted at the proper angle on the cross member 61 which extends between the carriers 45. The blade may be shaped as shown in Fig. 9 and may be adjusted by means of set screws 62 and may be fastened to the cross member by means of screws 63 which fit loosely through holes 64 in the blade and are screw threaded into the cross member. The blade 52 being set at an angle as shown in Fig. 9 allows the pulp, etc., which has been removed from the hemp to fall away from the scraper rather than collect. The roller 53 extends between the carriers 45 and at 65 and 66 said roller has shafts which run in bearings 67 and 68 in the carriers 45. When the clamp has passed between the rollers 53 and 55 it strikes lever 88 which stops the machine. Lever 88 is connected to lever 56 by means of connecting rod 89, thereby causing lever 56 to be moved when lever 88 is moved. The movement of lever 56 causes the disengagement of the clutch 24 as will be hereinafter described. After the machine is thus stopped, the carriers 45 are then raised by downward movement of lever 46, thus squeezing the fiber between the blade 52 and block 54 and between rollers 53 and 55. The machine is then started by engaging clutch 24 and locking lever 26 in notch 43 to drive the machine at the higher speed. The machine is then allowed to operate until chains 16 have carried clamp 10 around substantially to its starting position and until it strikes lever 56. The movement of lever 56, which is mounted on shaft 56ª, causes rod 57 to pull lever 57ª which is mounted on shaft 57ᵇ, in the direction indicated by the arrow in Fig. 2. Another lever 58 is also mounted on shaft 57ᵇ and the movement of lever 57ª causes lever 58 to move in the direction indicated by the arrow and thereby push the lever arm 26 out of the notch in which it was held, thus allowing the springs 41 and 42 to pull the lever 26 into neutral position, thereby disengaging the clutch 24 and stopping the movement of the chains 16. The lever 56 is held in its normal position by means of spring 69 which is attached to the lever at 70 and to the frame 71 at 72. The carriers 45 are at the same time released so that they can be lowered either by gravity or by hand (as is hereinafter described); and the clamp 10 with the cleaned fiber may then be removed from brackets 19 and another clamp holding uncleaned fiber may be fastened in the brackets.

The movement of lever 56, hereinbefore described, causes lever 73 (which is also mounted on shaft 56ª) to pull connecting rod 74 which is pivoted at 75 to lever 73 and also pivotally connected at 79 to a pin 76 which extends through a bracket 77 and normally projects into a hole 80 in rod 78 when the machine is in operation. The movement of connecting rod 74 withdraws the pin 76 from hole 80 which allows the rod 78 to be free to move. The rod 78 is pivotally connected to lever arm 46 at 82 and the release of rod 78 allows arm 46 to be moved. Arm 46 is fastened to the end of shaft 83 which extends beyond the frame of the machine. Shaft 83 is held in bearings 84 on frame member 85 and has mounted on it a bell crank 47. The carrier 45 which is slidably mounted on rods 60, which extend between frame member 85 and frame member 71, is raised and lowered by the movement of arm 46. When arm 46 is moved arms 47 move and cause the movement of carriers 45 and 45ª through connecting rods 50 which are pivotally connected to arms 47 at 47ª and to carriers 45 and 45ª at 50ª. In order to prevent binding and to support the carriers under the rollers as well as under the scraper, rods 49 are pivotally connected to arm 47 at 49ª and to bell cranks 48, which are pivoted at 48ª. The bell cranks 48 are connected to the carriers by means of connecting rods 51 pivoted at 90 and 90ª.

The hemp while being carried through the machine passes over drums 91 and 91ª which extend between sprockets 20 and between sprockets 21, respectively. There is also a guide 92 bolted to frame 71 which serves to hold the chain 16 and clamp 10 above the blade 52 while said clamp is passing between it and the block and between the rollers when 45 and 45ª are lowered.

The scraper through which the hemp passes comprises a dull edged knife or blade 52, the details of which have been described, coöperating with a block 54. The block 54 may be hardwood or the like and may be supported by a cross member 93 which extends across the machine, mounted on the frame 71. The grain of the wood in block 54 is parallel to the direction of travel of the hemp and transverse to the edge of blade 52. The setting of the block in this manner prevents the blade from cutting into the wood and also causes any slight grooving or slotting of the wood due to wear to be parallel to the hemp which is being drawn through the scraper. This wooden block, with its grain running in the direction stated, performs very well the office of an abutment to back up the fiber while being scraped by the scraper blade. The somewhat resilient quality of the wood is desirable; and this resiliency, and particularly of the softer portions between grains, allows smooth passage of the fiber and makes for proper scraping action. When the carriers are in the up position the blade is held firmly and unyieldingly against the block. The fiber after being stripped of the pulp and skin is rolled between rollers 53 and 55. The ends of roller 55 have shafts 96 and 97 which run in bearings 98 and 99 in frame 71. The rollers are geared together by gears 94 and 95 which are mounted on the shafts 65 and 96 respectively. The gears are in mesh when the carriers 45 and 45ª are in the up position. The rollers are driven, when the machine is being operated, from shaft 38 by means of chain 101 running over sprockets 102 and 103. The shaft 38 is driven from shaft 23 by means of chain 104 running over sprockets 100 and 105. The speed of the periphery of the rollers is slightly more than that at which the fiber is being drawn by the chains 16. This difference in speed causes the rollers to assist in drawing the fiber through the machine and keeps a tension on the fiber between the rollers and the scraper; and at the same time relieve the cleaned fiber from part of the tension as soon as it has passed the rolls.

After the hemp has passed through the machine and has been removed from the clamp there is a portion of it, at the end that was held in the clamp, that has not been cleaned. I have provided a small scraper, to be operated in connection with the main machine, that will remove the pulp and skin from the uncleaned ends. The cleaned ends of the fiber are given a few wraps around a small drum 106 which is being constantly driven by chain 107 running over sprockets 108 and 109. Sprocket 109 and drum 106 are both mounted on shaft 106ª. The foot pedal 110 which is pivoted at 111 is pushed down thus causing the scraper blade 112, which coöperates with block 113, to be lowered. The block 113 is the same in construction and operation, as block 54 and scraper 112 set at the same angle and is of the same general character as scraper 52. The blade 112 is mounted on a bell crank 114 which is pivoted at 115. Foot pedal 110 operates scraper 112 through a connecting rod 116 which is pivoted to the bell crank 114 at 117 and the foot pedal at 118. The uncleaned fiber is placed between the scraper 112 and the block 113 and the pedal 110 is released allowing the spring 119, which is connected to the bell crank 114 at 120 and the frame of the machine at 121, to cause the scraper 112 to coöperate with block 113. The friction of the hemp wound around the drum 106 is sufficient to cause the hemp to continue to wind on the drum and thus pull the uncleaned ends between the scraper and the block.

The function of the scrapers is not only to scrape the skin off the vegetable matter, but also to squeeze and press out the skin and the pulp. The levers which support the scraper may be set so as to hold the scraper with some force against the block, the resiliency of the block and the resiliency in the leverage system allowing the fiber to pass and at the same time keeping a pressure on the fiber.

Having described a preferred form of my invention, I claim:

1. In a machine of the class described, a dull edged knife, a block of wood arranged adjacent said knife with its grain extending transversely of the edge of said blade, and means for pressing and unyieldingly holding the knife against said block.

2. In a machine of the class described, a knife, a block of wood above said knife with its grain running transversely of the knife edge, means for moving one of said members to press and unyieldingly hold the knife edge against said block and means to draw material between the knife and the block.

3. In a machine for extraction of vegetable fiber, means for stripping and squeezing fibrous material, means for drawing fibrous material through said first mentioned means, a pair of rollers between which the material is drawn, and means for rotating said rollers in a direction to assist the movement of the material and at a speed higher than that at which the material is drawn through the machine.

4. In a machine for extraction of vegetable fiber, means for stripping and squeezing fibrous material, means for drawing fibrous material through said first mentioned means, a pair of rollers between which the material is drawn, and means for rotating said rollers in a direction to assist the movement of the material and at a speed higher that that at which the material is drawn through the machine, said rolls being located close to the first mentioned means and serving to relieve the fiber from longitudinal strain as soon as it has passed through the rolls.

5. In a machine for extraction of vegetable fiber, the combination of a stationary bar and a blade coöperating therewith, means to draw fibrous material therebetween embodying an endless carrier and a fiber clamp attachable to the carrier, and a pair of rolls between which the material passes immediately after passing the bar and blade, the blade and one of the rolls being movable, and manually operatable means to move the blade and said roll and to press and unyieldingly hold the blade firmly in place against said bar while the material is being drawn between the bar and blade.

6. In a machine for extraction of vegetable fiber, the combination of a stationary bar and a blade coöperating therewith, means to draw fibrous material therebetween embodying an endless carrier and a fiber clamp attachable to the carrier, and a pair of rolls between which the material passes immediately after passing the bar and blade, means to positively move the blade to and from the bar, and means to rotate said rollers at a speed higher than the speed at which the carrier moves, so that the rollers aid to move the material and take the tension off it as soon as past the rollers.

7. In a machine for extraction of vegetable fiber, a material clamp for the purpose described, embodying a grooved bar, two shorter grooved bars pivoted at one end to the center of the longer bar, said bars adapted to mesh together, and yoke and eccentric means for holding the free ends of the shorter bars against the longer bar.

8. In a machine for extraction of vegetable fiber, the combination of spaced parallel carrier chains having sockets thereon, a clamp embodying a bar long enough to reach between chains and have its ends in sockets thereon, clamping bars hinged to said first mentioned bar, means for holding the clamping bars against said mentioned bar, said sockets having apertures therein, and catches on the first mentioned bar adapted to enter the socket apertures to hold the ends of said bar in the sockets and to prevent spreading of the chains.

In witness that I claim the foregoing I have hereunto subscribed my name this seventh day of May, 1919.

CHARLES PARRIS STEWART.

Witnesses:
JOSE R. CUADRA,
GERARDO F. ALEJÓ.